US012795100B2

(12) United States Patent
Fuldseth

(10) Patent No.: US 12,795,100 B2
(45) **Date of Patent: *Nov. 10, 2026**

(54) REPRESENTING COLOR INDICES BY USE OF CONSTANT PARTITIONS

(71) Applicant: Cisco Technology, Inc., San Jose, CA (US)

(72) Inventor: Arild Fuldseth, Snarøya (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/311,015

(22) Filed: Aug. 27, 2025

(65) Prior Publication Data

US 2025/0379982 A1 Dec. 11, 2025

Related U.S. Application Data

(63) Continuation of application No. 17/706,831, filed on Mar. 29, 2022, now Pat. No. 12,470,713.

(60) Provisional application No. 63/300,334, filed on Jan. 18, 2022.

(51) Int. Cl.

| | |
|---|---|
| ***H04N 19/13*** | (2014.01) |
| ***H04N 19/136*** | (2014.01) |
| ***H04N 19/167*** | (2014.01) |
| ***H04N 19/176*** | (2014.01) |
| ***H04N 19/46*** | (2014.01) |

(52) U.S. Cl.

CPC ........... *H04N 19/13* (2014.11); *H04N 19/136* (2014.11); *H04N 19/167* (2014.11); *H04N 19/176* (2014.11); *H04N 19/46* (2014.11)

(58) Field of Classification Search

CPC ...... H04N 19/13; H04N 19/91; H04N 19/136; H04N 19/167; H04N 19/176; H04N 19/46; H04N 19/70

See application file for complete search history.

(56) References Cited

U.S. PATENT DOCUMENTS

| | | | |
|---|---|---|---|
| 9,706,212 | B2 | 7/2017 | Yu et al. |
| 10,397,568 | B2 | 8/2019 | Liu et al. |
| 10,743,031 | B2 | 8/2020 | Chuang et al. |
| 11,025,905 | B2 | 6/2021 | Ye et al. |
| 2015/0287165 | A1 | 10/2015 | Berghoff |
| 2016/0057447 | A1 | 2/2016 | Pu et al. |
| 2023/0020674 | A1 | 1/2023 | Kim et al. |

FOREIGN PATENT DOCUMENTS

| | | | |
|---|---|---|---|
| EP | 3164993 | B1 | 10/2018 |
| WO | 2016161974 | A1 | 10/2016 |

OTHER PUBLICATIONS

Guo X., et al., "AHG8: Major-color-based Screen Content Coding," JCTVC-00182, Joint Collaborative Team on Video Coding (JCT-VC) of ITU-T SG 16 WP 3 and ISO/IEC JTC 1/SC 29/G 11, 15th Meeting: Geneva, CH, Oct. 23-Nov. 1, 2013, 10 Pages.

(Continued)

*Primary Examiner* — Boubacar Abdou Tchoussou

(74) *Attorney, Agent, or Firm* — Edell, Shapiro & Finnan, LLC

(57) ABSTRACT

Presented herein are a variety of palette mode encoding and decoding techniques that can achieve further compression benefits. The techniques can be generalized to use arbitrary block partitions instead of rows, for instance columns of identical indices, or quadrants of identical indices.

25 Claims, 9 Drawing Sheets

(56) References Cited

OTHER PUBLICATIONS

Guo X., et al., "RCE4: Test 1. Major-color-based Screen Content Coding", JCTVC-P0108, Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, pp. 1-12.
Han J., et al., "A Technical Overview of AV1," IEEE, Feb. 8, 2021, 25 Pages, Retrieved from URL: https://arxiv.org/pdf/2008.06091v2.
International Search Report and Written Opinion in counterpart International Application No. PCT/US2023/010373, mailed Jul. 17, 2023, 16 Pages.
Liu S., et al., "Overview of HEVC Extensions on Screen Content Coding," Industrial Technology Advances, APSIPA Transactions on Signal and Information Processing , vol. 4, Aug. 2015, e10, 12 Pages.
Nguyen T., et al., "Overview of the Screen Content Support in VVC: Applications, Coding Tools, and Performance," IEEE Transactions on Circuits and Systems for Video Technology, Apr. 2021, 19 Pages.
Partial International Search Report in Counterpart International Application No. PCT/US2023/010373, mailed May 23, 2023, 6 pages.
Pu W., et al., "Palette Mode Coding in HEVC Screen Content Coding Extension," IEEE Journal on Emerging and Selected Topics in Circuits and Systems, Dec. 2016, vol. 6, No. 4, 13 Pages.
Sun Y-C., et al., "Analysis of Palette Mode on Versatile Video Coding," IEEE Conference on Multimedia Information processing and Retrieval (MIPR), Mar. 2019, 4 Pages.
Wien M., et al., "Versatile Video Coding—Algorithms and Specification," VVC Tutorial, IEEE International Conference on Multimedia and Expo, Jul. 10, 2020, 167 Pages, Retrieved from URL: https://signalprocessingsociety.org/sites/default/files/uploads/community_involvement/docsllCME2020_MMSPTC_VideoSlides_Versatile_Video_Coding.pdf.
Wikipedia: "Indexed Color," Oct. 17, 2021, 7 Pages, Retrieved from URL: https://en.wikipedia.org/wiki/Indexed_color.
Xu X., et al., "Overview of Screen Content Coding in Recently Developed Video Coding Standards," IEEE Transactions on Circuits and Systems for Video Technology, Feb. 2022, vol. 32, No. 2, 11 Pages.
Zhu J., et al., "AHG10: Adaptive Scan Order on Palette Based Coding", JCTVC-Q0169, Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, pp. 1-4.

100

| | | | |
|---|---|---|---|
| 117 | 55 | 214 | 117 |
| 55 | 117 | 214 | 55 |
| 117 | 117 | 214 | 55 |
| 117 | 55 | 55 | 117 |

FIG. 1

200

| | | | |
|---|---|---|---|
| 1 | 0 | 2 | 1 |
| 0 | 1 | 2 | 0 |
| 1 | 1 | 2 | 0 |
| 1 | 0 | 0 | 1 |

FIG. 2

REPRESENTING COLOR INDICES BY USE OF CONSTANT PARTITIONS

CROSS REFERENCE TO RELATED APPLICATIONS

This application is a continuation of U.S. application Ser. No. 17/706,831, filed Mar. 29, 2022, which claims priority to U.S. Provisional Application No. 63/300,334, filed Jan. 18, 2022, the entirety of which is incorporated herein by reference.

TECHNICAL FIELD

The present disclosure relates to video coding/decoding techniques.

BACKGROUND

Palette mode is used in video compression standards (HEVC/H.265, VVC/H.266 and AV1) to efficiently represent blocks with only a few colors (palette) compared to the full color range. Such blocks typically occur when encoding computer-generated content, for example.

BRIEF DESCRIPTION OF THE DRAWINGS

FIG. 1 is a diagram illustrating an example block of original pixel data with 3 different colors.

FIG. 2 is a diagram of the color indices of the block of FIG. 1.

DESCRIPTION OF EXAMPLE EMBODIMENTS

Overview

Figure 3A:
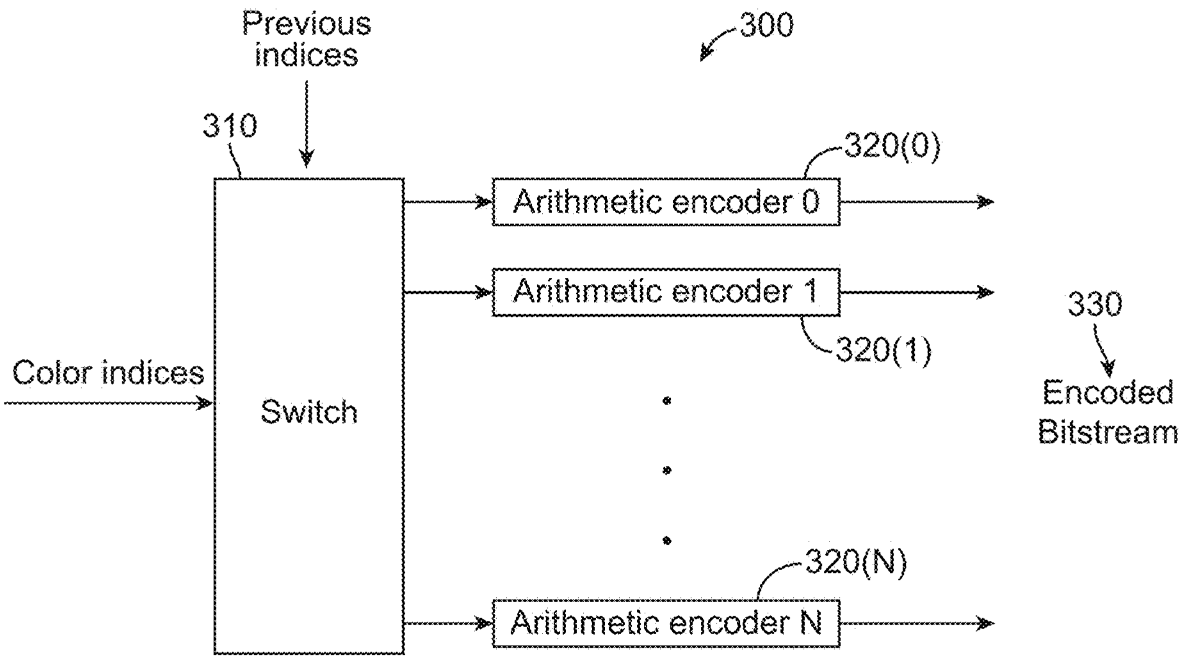
FIG. 3A is a high-level block diagram of arithmetic coding of color indices depending on context of previously signaled indices, according to an example embodiment.

Presented herein are a variety of palette mode encoding and decoding techniques that can achieve further compression benefits. The techniques can be generalized to use arbitrary block partitions instead of rows, for instance columns of identical indices, or quadrants of identical indices.

In one embodiment, a video encoding method is provided. The video encoding method includes obtaining pixel data for a plurality of regions that make up a video frame; identifying when pixels within a given region of the plurality of regions have the same color; assigning an identity flag to the given region to indicate that only a single color index to be used for all pixels of the given region is signaled; and arithmetic coding the identity flag such that a probability distribution of the arithmetic coding is dependent on a context that is based on previously signaled information.

In another embodiment, a video decoding method is provided. The video decoding method includes obtaining encoded video data; performing arithmetic decoding of an identity flag in the encoded video data using a context that is based on previously signaled information, the identity flag indicating that a given region of a plurality of regions that make up a video frame has only a single color index to be used for all pixels of the given region; and decoding the given region using the single color index.

EXAMPLE EMBODIMENTS

For a block that is encoded in palette mode, the following information is typically signaled by the encoder to the decoder for each color plane (for instance red (R), green (G), and blue (B) or luminance (luma) (Y), chrominance (chroma) blue projection (U), and chrominance red projection (V)).

At the block level:

- One flag indicating whether the block is encoded in palette mode or normal mode.
- The number of colors (palette size): One number, N.
- The values of each color in the palette: N numbers in the range [0, 255] (8-bit video).

At the pixel level:

- One number (color index) in the range [0, N−1].

Alternatively, it is possible to combine two or more color planes so that the palette consists of N color pairs (for instance for U and V) or N color triplets. In this case, each color index signaled at the pixel level represents pairs or triplets of colors for two or three color components.

Palette mode can be both lossless and lossy. In lossless mode, all colors of the original blocks can be represented by the chosen palette of N colors. In lossy palette mode, some colors in the original block cannot be represented by the chosen palette.

An example of the lossless palette mode is provided in the following, with reference to FIG. 1. A 4×4 block 100 of original pixel data has three different colors 55, 117, and 214 in the luma component as illustrated in FIG. 1. Representing this block 100 in lossless palette mode would imply sending the following information to the decoder.

At the block level:
palette mode on/off: 1 (on)
palette size: 3
palette colors: 55, 117, 214
At the pixel level:
Indices from the set {0,1,2} representing the colors 55, 117 and 214 respectively.

The resulting color indices from the block 100 of FIG. 1 are illustrated at 200 in FIG. 2.

Typically, to minimize the number of bits, the indices are encoded using arithmetic coding that is tuned to the probability distribution of each index value (for instance 20%, 45%, and 35% for index values 0, 1, and 2 respectively). The arithmetic encoder can be made even more efficient by making the assumed probability distribution dependent on previously signaled index values. This is achieved by deriving a context value (an integer number) depending on previously signaled indices and using a different arithmetic coder for each context value.

Figure 3B:
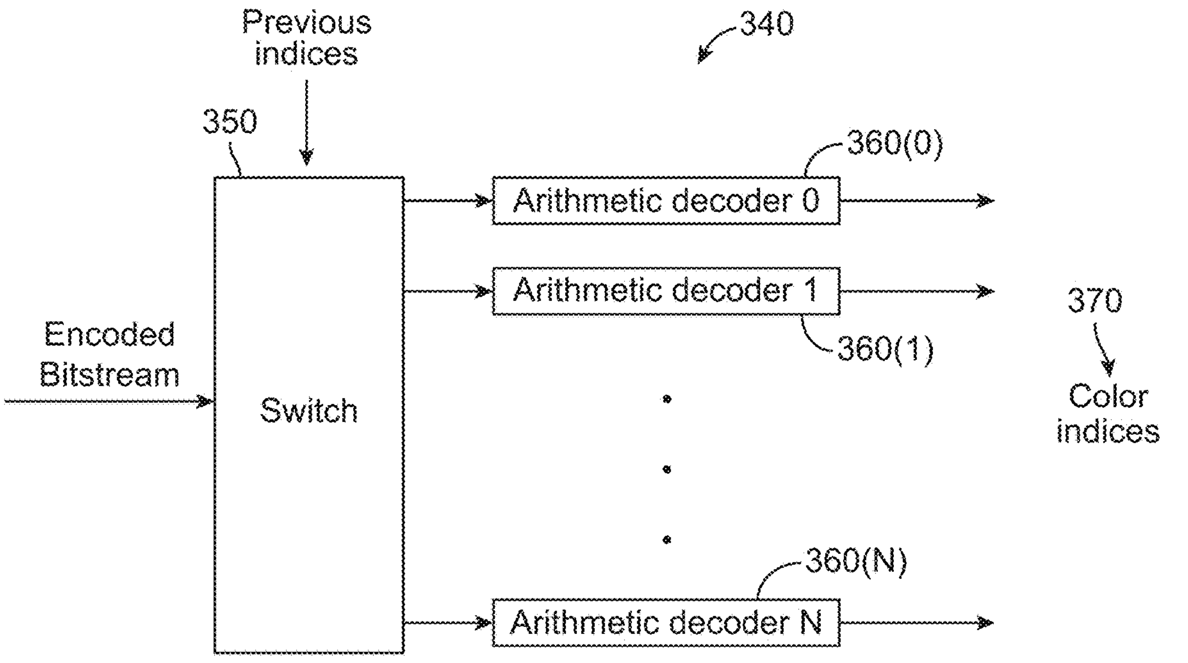
FIG. 3B is a high-level block diagram of arithmetic decoding of color indices depending on context of previously signaled indices, according to an example embodiment.

FIG. 3A illustrates a logical representation of arithmetic encoding of color indices. FIG. 3B illustrates a logical representation of arithmetic decoding. In FIG. 3A, an arithmetic encoding process 300 involves selecting/switching 310, among a plurality of arithmetic encoders 320(0)-320(N). The selecting/switching 310 is based on color indices of a current region and color indices of regions that have been previously signaled. The output of the arithmetic encoding process 300 is an encoded bitstream 330.

In FIG. 3B, an arithmetic decoding process 340 involves selecting/switching 350 among a plurality of arithmetic decoders 360(0)-360(N) based on the encoded bitstream and indices of regions that have been previously signaled, to recover color indices 370 for a current region.

Figure 4A:
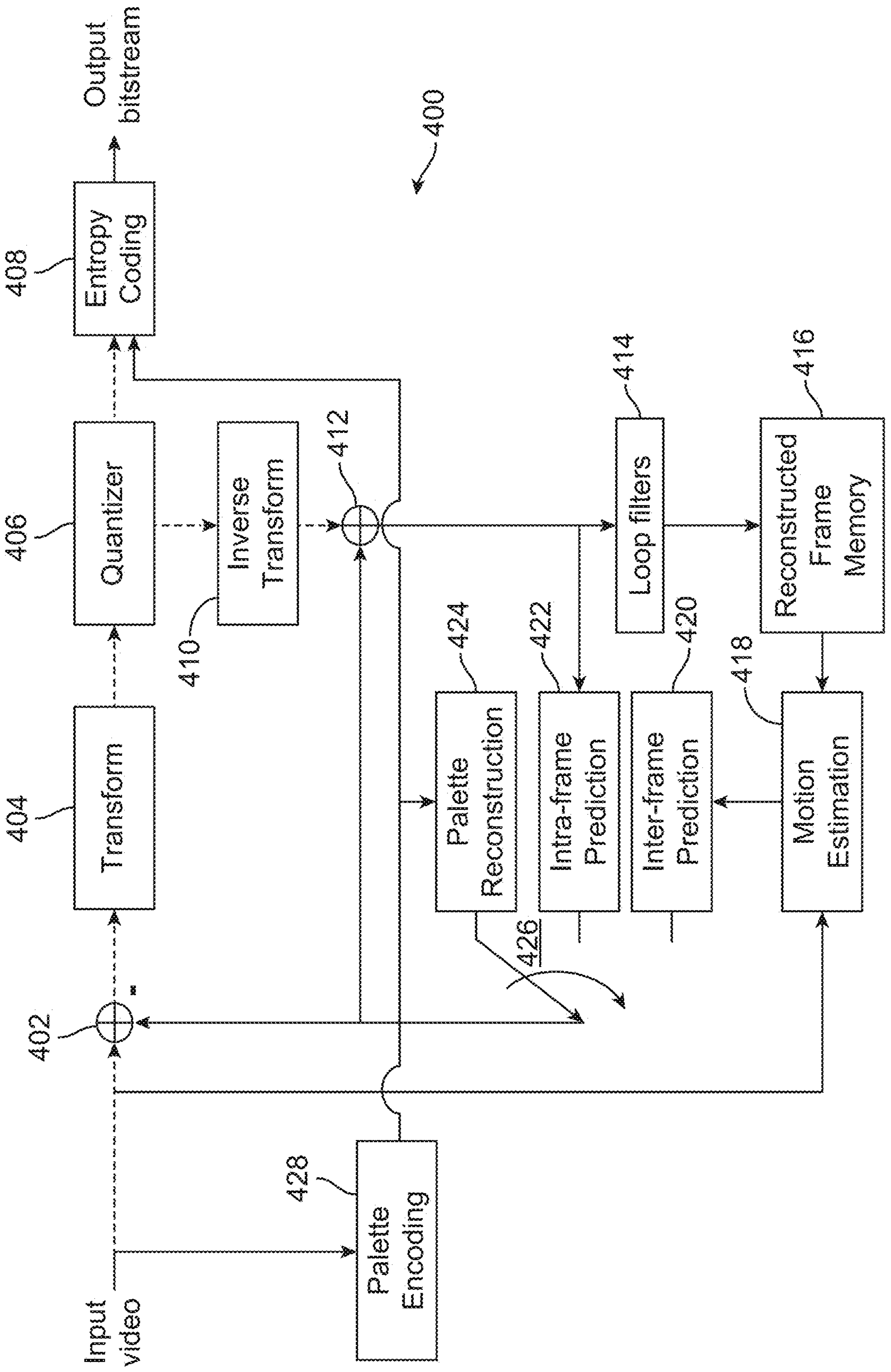
FIG. 4A is a block diagram of a video encoder configured with palette mode functionality, according to an example embodiment.
Figure 4B:
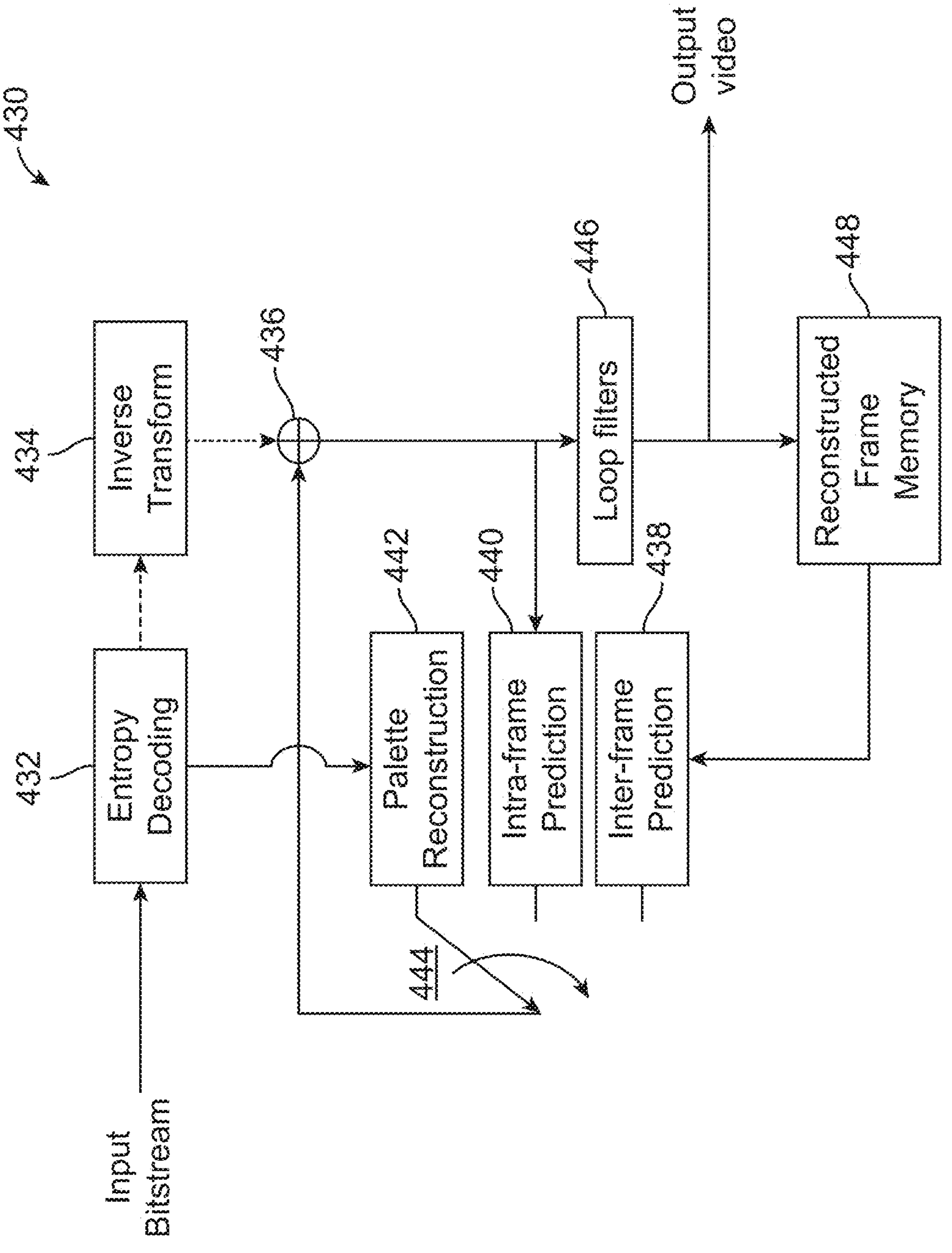
FIG. 4B is a block diagram of a video decoder configured with palette mode functionality, according to an example embodiment.

Palette mode functionality may be included in a video encoder as illustrated in FIG. 4A and in a video decoder as illustrated in FIG. 4B. For palette mode blocks, the signal paths illustrated with dotted lines in FIG. 4A and FIG. 4B are not present in HEVC/H.265, but are optional in other video codec standards, such as the AV1 video codec standard.

Referring to FIG. 4A, a video encoder 400 receives input video to be encoded. The video encoder 400 includes various blocks, functions or modules (these terms used interchangeably in this regard), including a subtractor 402, a transform module 404, a quantizer module 406, an entropy coding module 408, an inverse transform module 410, an adder 412, one or more loop filters 414, a reconstructed frame memory 416, a motion estimation module 418, an inter-frame prediction module 420, an intra-frame prediction module 422, a palette reconstruction module 424 and a switch 426. There is also a palette encoding module 428 that performs palette encoding using the techniques presented herein.

A current frame (input video) as well as a prediction frame are input to subtractor 402. The subtractor 402 is provided with input from either the inter-frame prediction module 420, the intra-frame prediction module 422, or the palette reconstruction module 424, the selection of which is controlled by switch 426. Intra-prediction processing is selected for finding similarities within the current image frame, and is thus referred to as "intra" prediction. Motion compensation has a temporal component and thus involves analysis between successive frames that is referred to as "inter" prediction. The motion estimation module 418 supplies a motion estimation output as input to the inter-frame prediction module 420. The motion estimation module 418 receives as input the input video and an output of the reconstructed frame memory 416. The palette encoding module 428 receives the input video and generates palette encoded data that is supplied to the palette reconstruction module 424 and to the entropy coding module 408.

The subtractor 402 subtracts the output of the switch 426 from the pixels of the current frame, prior to being subjected to a two dimensional transform process by the transform module 404 to produce transform coefficients. The transform coefficients are then subjected to quantization by quantizer module 406 and then supplied to entropy coding module 408. Entropy coding module 408 applies entropy encoding (e.g., arithmetic encoding) in order to remove redundancies without losing information, and is referred to as a lossless encoding process. Subsequently, the encoded data is arranged in network packets via a packetizer (not shown), prior to being transmitted in an output bit stream.

The output of the quantizer module 406 is also applied to the inverse transform module 410 and used for assisting in prediction processing. The adder 412 adds the output of the inverse transform module 410 and an output of the switch 426 (the output of the inter-frame prediction module 420, the intra-frame prediction module 422 or the palette reconstruction module 424). The output of the adder 412 is supplied to the input of the intra-frame prediction module 422 and to one or more loop filters 414 which suppress some of the sharpness in the edges to improve clarity and better support prediction processing. The output of the loop filters 414 is applied to a reconstructed frame memory 416 that holds the processed image pixel data in memory for use in subsequent motion processing by motion estimation module 418.

Reference is now made to FIG. 4B, which shows a video decoder 430 that includes various blocks, functions or modules (these terms used interchangeably in this regard). The video decoder 430 includes an entropy decoding module 432, an inverse transform module 434, an adder 436, an intra-frame prediction module 438, an inter-frame prediction module 440, and a palette reconstruction module 442, a switch 444, one or more loop filters 446 and a reconstructed frame memory 448. The entropy decoding module 432 performs entropy decoding on the received input bitstream to produce quantized transform coefficients which are applied to the inverse transform module 434. The inverse transform module 434 applies two-dimensional inverse transformation on the quantized transform coefficients to output a quantized version of the difference samples. The output of the inverse transform module 434 is applied to the adder 436. The adder 436 adds to the output of the inverse transform module 434 an output of the intra-frame prediction module 438, the inter-frame prediction module 440 or the palette reconstruction module 442. The loop filters 446 operate similarly to that of the loop filters 414 in the video encoder 400 of FIG. 4B. An output video image is taken at the output of the loop filters 446.

Figure 5A:
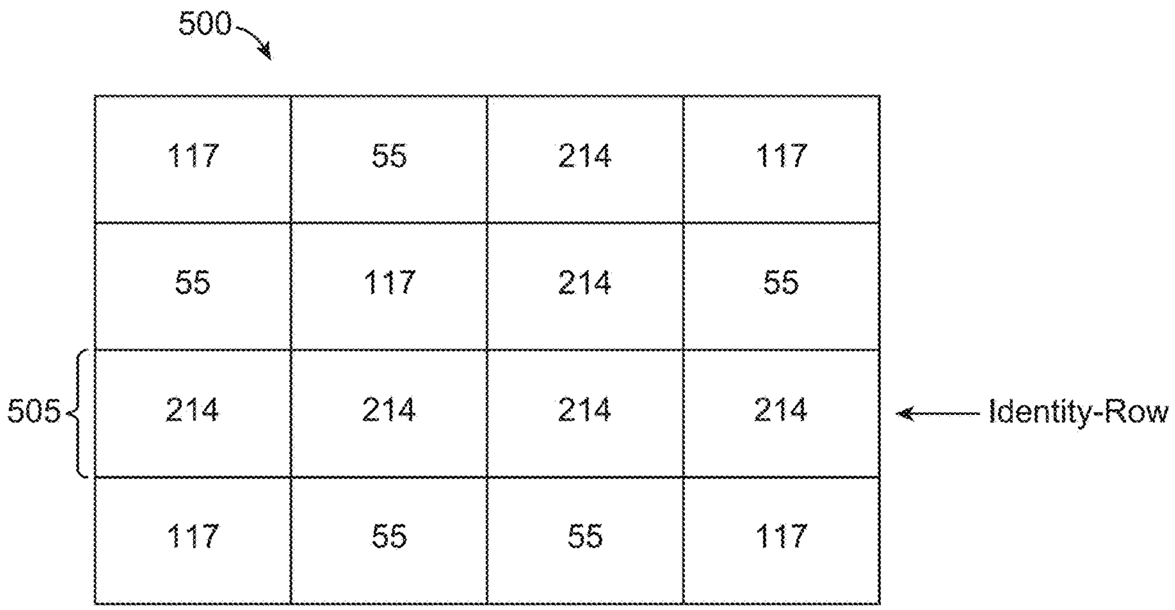
FIG. 5A is a diagram of a block of original pixel data with one identity-row that has pixels with the same indices, according to an example embodiment.
Figure 5B:
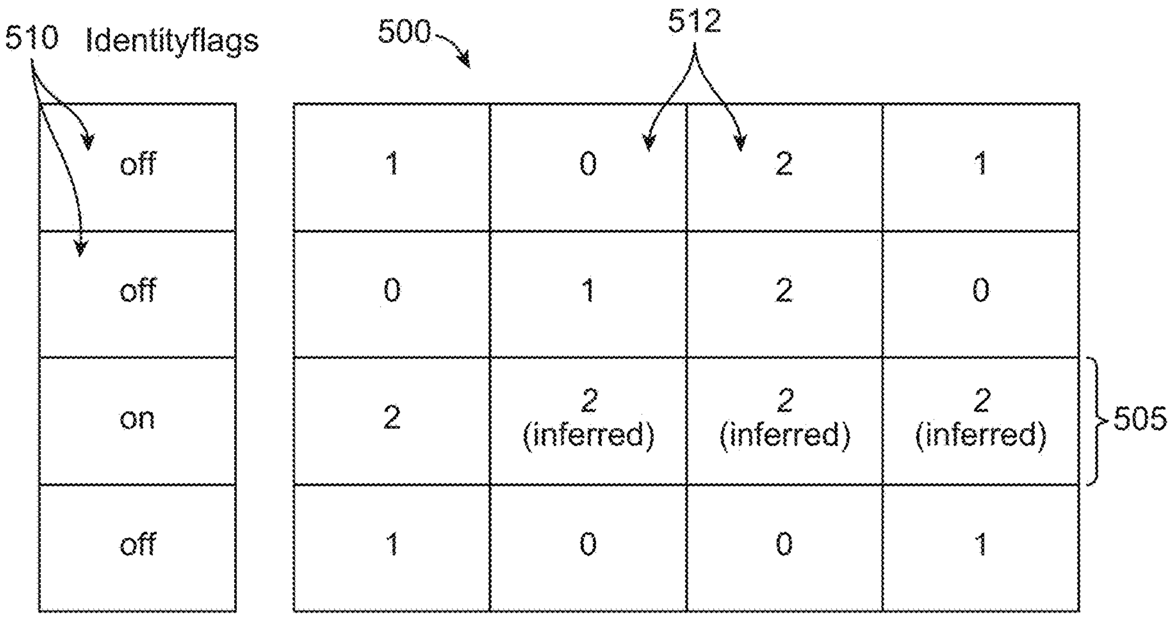
FIG. 5B is a diagram of a representation of the block of FIG. 5A using identity flags and indices, according to an example embodiment.

Within a block that is coded in palette mode, there can be large contiguous areas that have the same index values. One aspect of the techniques presented herein is to save bits (bandwidth) by representing such areas in a more efficient way. In one embodiment, the encoder identifies rows within each block where all pixels of the row have the same color. This is shown in the third row 505 of a block 500 shown in FIG. 5A, for example. Such rows in which all the pixels have the same color can be referred to as identity-rows. At the beginning of each row, one identity flag is signaled to the decoder indicating whether or not the current row is an identity-row. If the identity flag indicates an identity-row, only the first index of that row is signaled to the decoder, while the remaining indices can be inferred. For rows that are not identity-rows, indices are signaled for all pixels in the row. FIG. 5B shows a representation of the block of FIG. 5A in a bitstream through the use of identity flags 510 and indices 512.

At the decoder side, the identity flags for each row are decoded. If the identity flag is off, one index for each sample in the row is decoded. If the identity flag is on, only the first index of the row is decoded, while the other indices of the row are inferred to be equal to the first index of the row. This is shown, in FIG. 5B, for the third row 505 of the block 500.

In another embodiment, the encoder can identify identity columns and signal one identity flag per column. In yet another embodiment, the encoder can identify identity sub-blocks (for instance quadrants) and send one identity flag per sub-block. In yet another embodiment, the identity flags can represent arbitrarily shaped regions (not just rows, columns or sub-blocks) within the block. Finally, in one embodiment, region type selection information is sent at the block-level or at a higher level (frame-tile- or sequence-level) to select between various types of regions to be represented by the identity flags (for instance identity-rows, identity-columns, identity-sub-blocks, etc.). The region type selection information is used by a decoder. More specifically, a video decoder detects in the encoded video data, region type selection information that indicates a region type represented by an identity flag. The video decoder adaptively switches between types of regions for which the identity flag is to be used based on the region type selection information.

To reduce the bandwidth further, it is desired to minimize the number of bits needed to represent the identity flags. Typically, these flags are encoded and decoded using arithmetic encoding that is tuned to the probability distribution of the values of the flags (for instance 20% probability for on and 80% probability for off). This allows for using less than one bit per flag on average. The arithmetic coding can be made even more efficient by making the probability distribution dependent on previously signaled information (context) in the same block. This implies deriving a context value (a positive integer number) from previously signaled information and using an arithmetic encoder (a function that is part of an entropy encoder) and arithmetic decoder (a function that is part of an entropy decoder) tuned for different probability distributions dependent on the context. In the video encoder, the contexts are used to configure an arithmetic encoder, while in the video decoder, the contexts are used to configure an arithmetic decoder.

In one embodiment, two context values (0 and 1) are used, one for the case where the identity flag of the previous row is off and one for the case where the identity flag of the previous row is on. This is illustrated in FIG. 6A for the encoder and in FIG. 6B for the decoder.

Figure 6A:
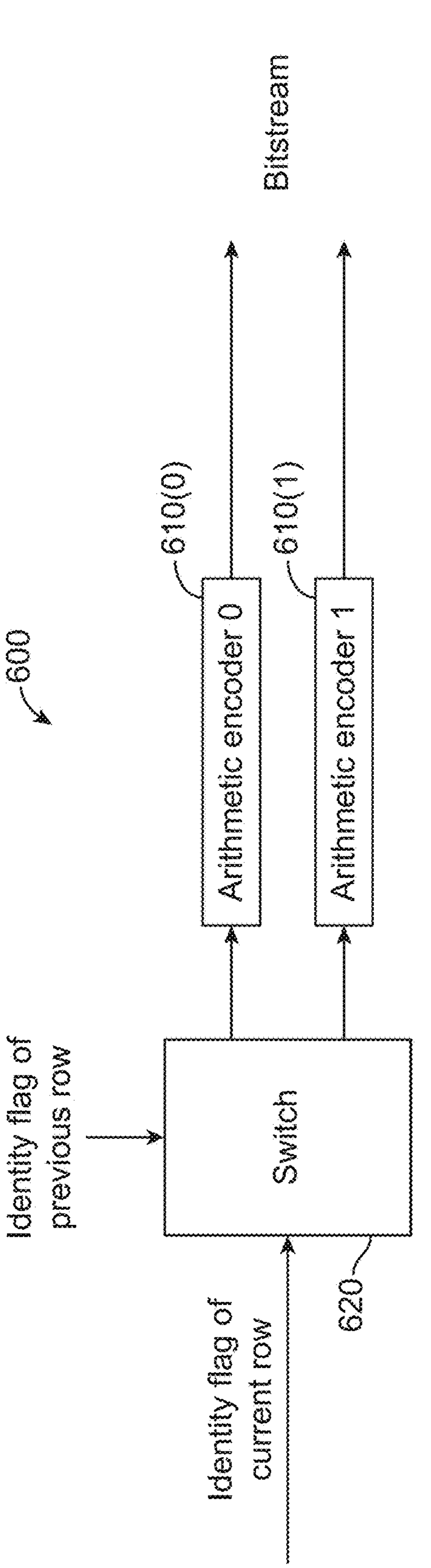
FIG. 6A is a high-level block diagram of arithmetic encoding of an identity flag, according to an example embodiment.

Specifically, in FIG. 6A, an arithmetic encoding arrangement 600 is shown in which there are two arithmetic encoders 610(0) and 610(1), and a switch 620. The switch 620 receives as input an identity flag of the current row being encoded and an identity flag of a previous row (that was already encoded). The switch 620 selects one of the two arithmetic encoders 610(0) and 610(1), used to encode the identity flag of the current row, based on the identity flag of the current row and the identity flag of a previous row.

Figure 6B:
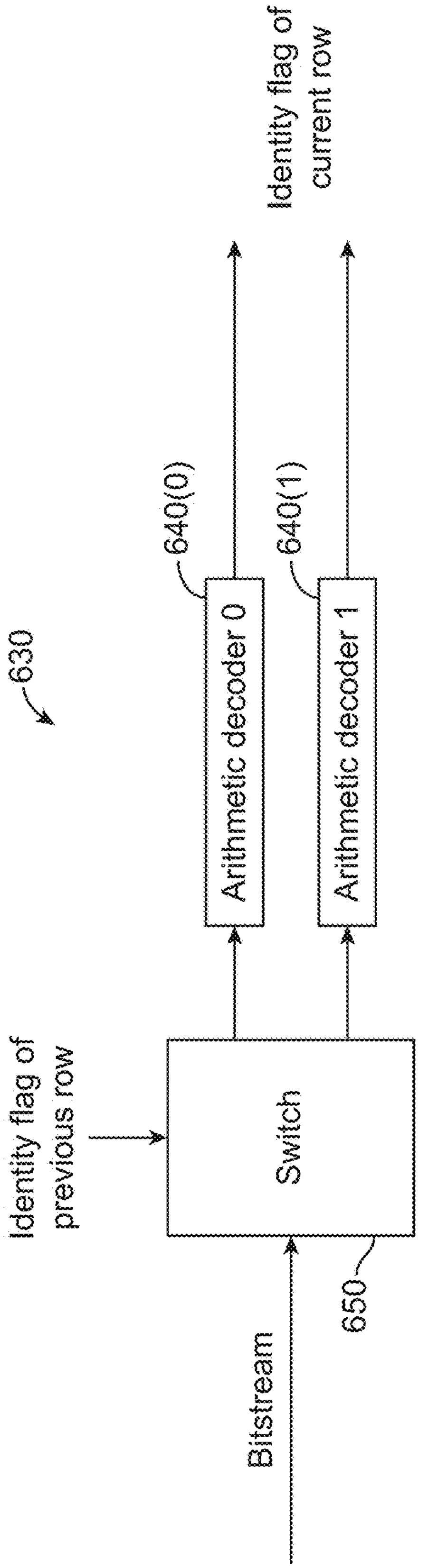
FIG. 6B is a high-level diagram of arithmetic decoding of an identity flag, according to an example embodiment.

FIG. 6B illustrates an arithmetic decoding arrangement 630 is shown in which there are two arithmetic decoders 640(0) and 640(1), and a switch 650. The switch 650 receives as input an identity flag of a previous row and the encoded bitstream. The switch 650 selects one of the two arithmetic decoders 640(0) and 640(1), used to decode the identity flag of a current row, based on the identity flag of a previous row.

In another embodiment, a third context value is used for the first row of the blocks. In yet another embodiment, the context values are derived from the identity flags of more than one previous row. In the general case, where the identity flags represent columns or sub-blocks or other sub-regions, the context for the current identity flag can be derived from previously signaled identity flags.

Finally, the number of bits used to represent the indices can be reduced by using contexts that not only depend on previously signaled indices but also on previously signaled identity flags. This is illustrated in FIG. 7A for an encoder and in FIG. 7B for a decoder.

Figure 7A:
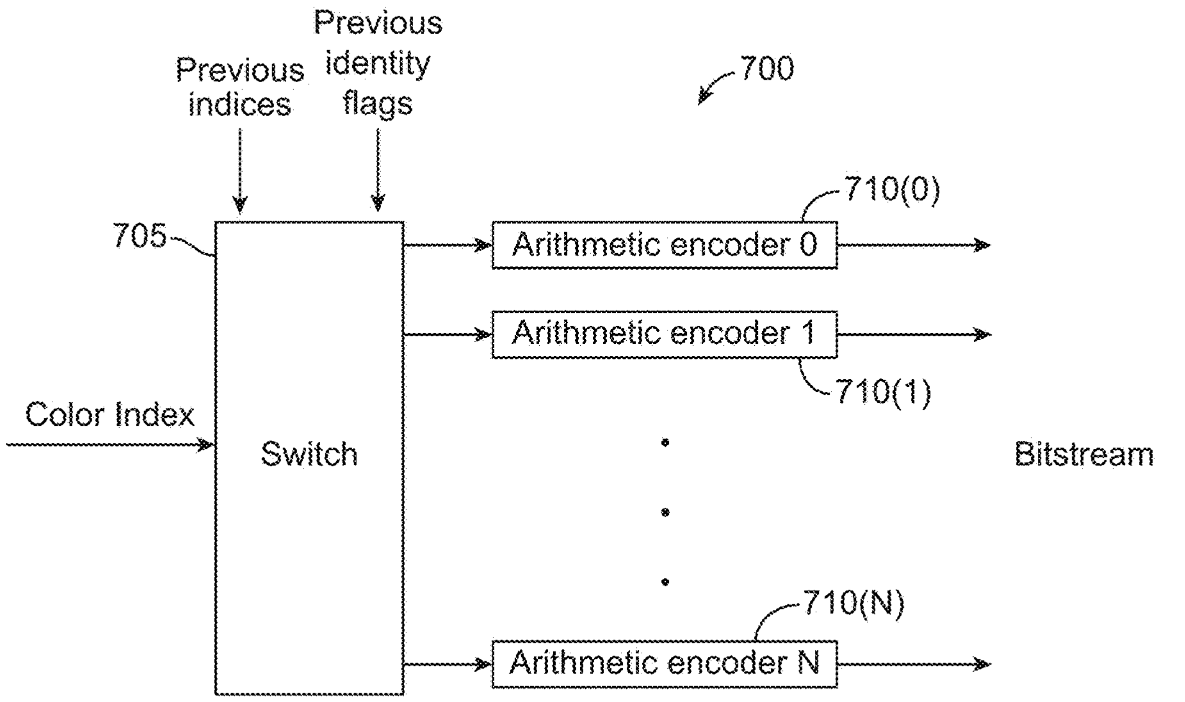
FIG. 7A is a high-level diagram of arithmetic encoding that uses previously signaled indices and identity flags to further reduce the number of bits used to represent the indices, according to an example embodiment.

Referring to FIG. 7A, an arithmetic encoding arrangement 700 includes a switch 705 and a plurality of arithmetic encoders 710(0)-710(N). The switch 705 receives a color index, previous color indices and previous identity flags, and selects which one of the arithmetic encoders 710(0)-710(N) to use to encode the color index of the given (identity) region based on the color indices signaled for previous regions and identity flags signaled for the given region and previous regions.

Figure 7B:
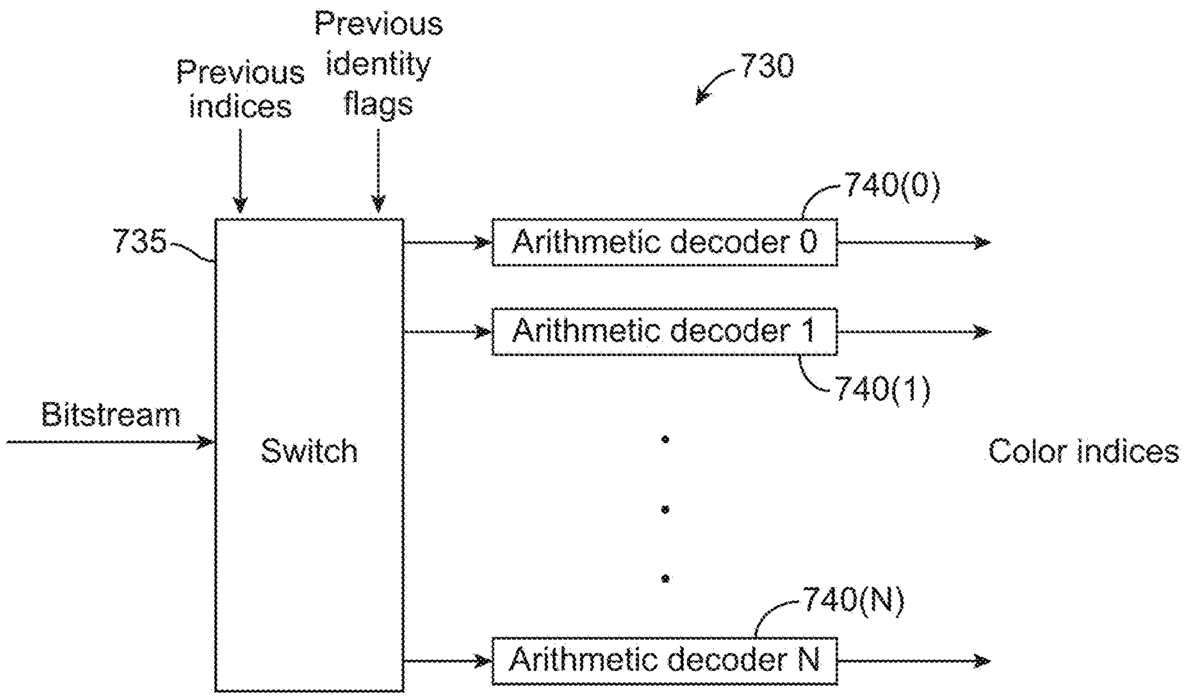
FIG. 7B is a high-level diagram of arithmetic decoding in which previously signaled indices and identity flags are used to further reduce the number of bits used to represent the indices, according to an example embodiment.

FIG. 7B illustrates an arithmetic decoding arrangement 730 that includes a switch 735 and a plurality of arithmetic decoders 740(0)-740(N). The switch 735 receives as input an encoded bitstream, previous indices and previous identity flags, and selects which of the arithmetic decoders 740(0)-740(N) to use to decode the single color index of the given (identity) region based on the color indices signaled for previous regions and identity flags signaled for the given region and previous regions.

The video encoding and decoding arrangements presented herein may be implemented by digital logic gates in an integrated circuit (e.g., by an application specific integrated circuit) or by two or more separate logic devices. Alternatively, the video encoding and decoding arrangements may be implemented by software executed by one or more processors.

Figure 8:
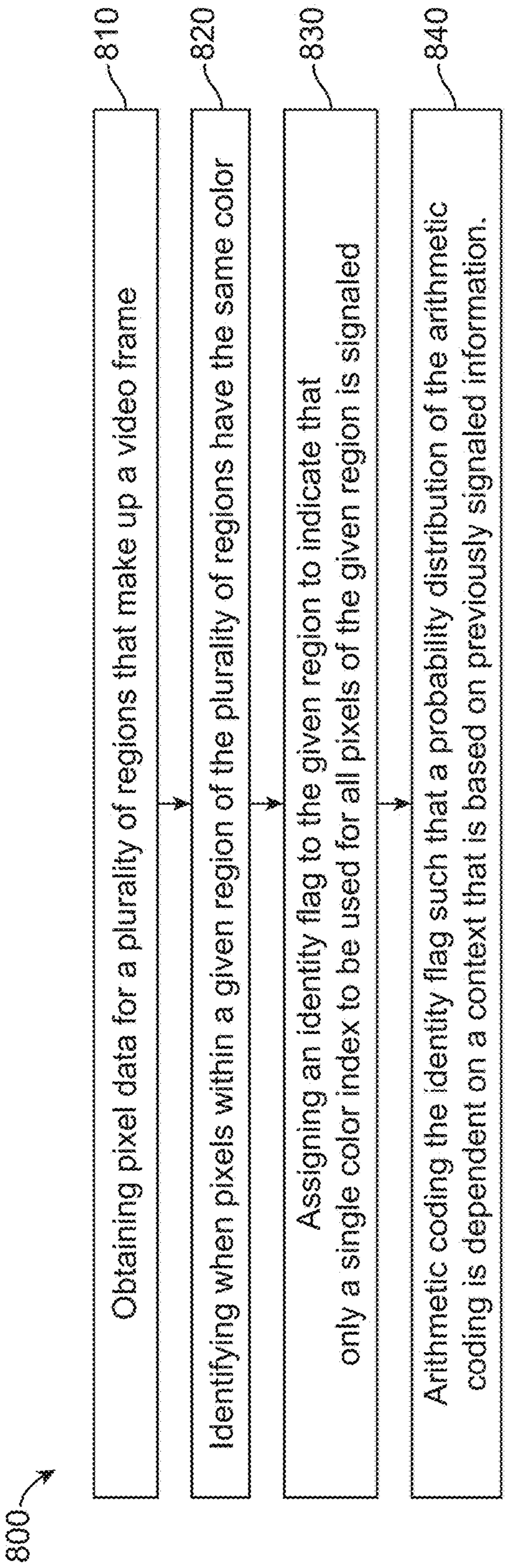
FIG. 8 is a flow chart of a video encoding method according to an example embodiment.

Reference is now made to FIG. 8. FIG. 8 is a flow chart depicting a method 800 for encoding video data using palette coding techniques presented herein. At 810, the method 800 includes obtaining pixel data for a plurality of regions that make up a video frame. At 820, the method 800 includes identifying when pixels within a given region of the plurality of regions have the same color. At 830, the method 800 includes assigning an identity flag to the given region to indicate that only a single color index to be used for all pixels of the given region is signaled. At 840, the method includes arithmetic coding the identity flag such that a probability distribution of the arithmetic coding is dependent on a context that is based on previously signaled information.

As described above, the video frame may be divided into a plurality of blocks, and the plurality of regions are rows, columns or sub-blocks within a respective block of the plurality of blocks.

Also as described above, the method 800 may further comprise including region type selection information that signals a region type to be represented by the identity flag to enable adaptively switching between types of regions for which the identity flag may be signaled. For example, the region type selection information that signals a region type to be represented by the identity flags is signaled at a block-level, frame-level, tile-level or sequence-level.

As described above in connection with FIG. 6A, the context used in arithmetic coding operation 840 may be based on identity flags previously signaled for one or more regions, such as an identity flag signaled for a previous region. For example, the context may include an identity flag of a previous row that is used to arithmetically encode an identity flag of a current row. Further still, as described above in connection with FIG. 7A, the arithmetic coding operation 840 comprises arithmetic coding the single color index of the given region, wherein the context is based on the color indices signaled for previous regions and identity flags signaled for the given region and previous regions.

Figure 9:
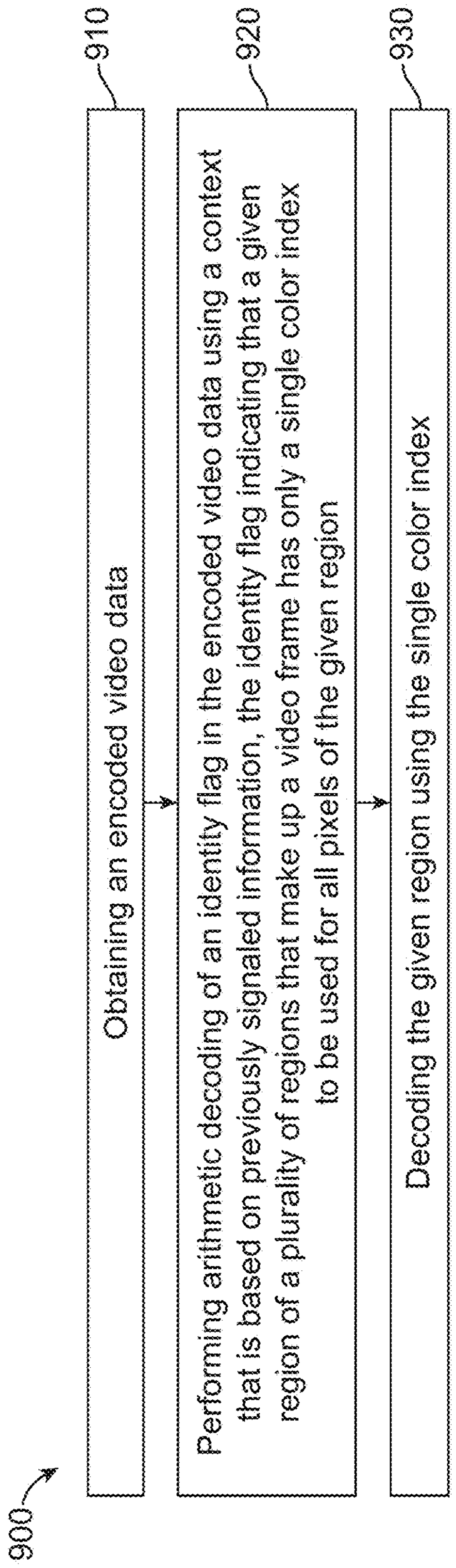
FIG. 9 is a flow chart of a video decoding method according to an example embodiment.

FIG. 9 illustrates a flow chart depicting a method 900 for decoding video data using palette decoding techniques presented herein. At 910, the method 900 includes obtaining encoded video data. At 920, the method includes performing arithmetic decoding of an identity flag in the encoded video data using a context that is based on previously signaled information, the identity flag indicating that a given region of a plurality of regions that make up a video frame has only a single color index to be used for all pixels of the given region. At 930, the method 900 includes decoding the given region using the single color index.

As described above, the video frame may be divided into a plurality of blocks, and the plurality of regions are rows, columns or sub-blocks within a respective block of the plurality of blocks.

Further, the method 900 may further include detecting in the encoded video data region type selection information that indicates a region type represented by the identity flag, and adaptively switching between types of regions for which the identity flag is to be used based on the region type selection information. The region type selection information indicates which region type the identity flags represent and region type selection information can be signaled at a block-level, frame-level, tile-level or sequence-level.

Figure 10:
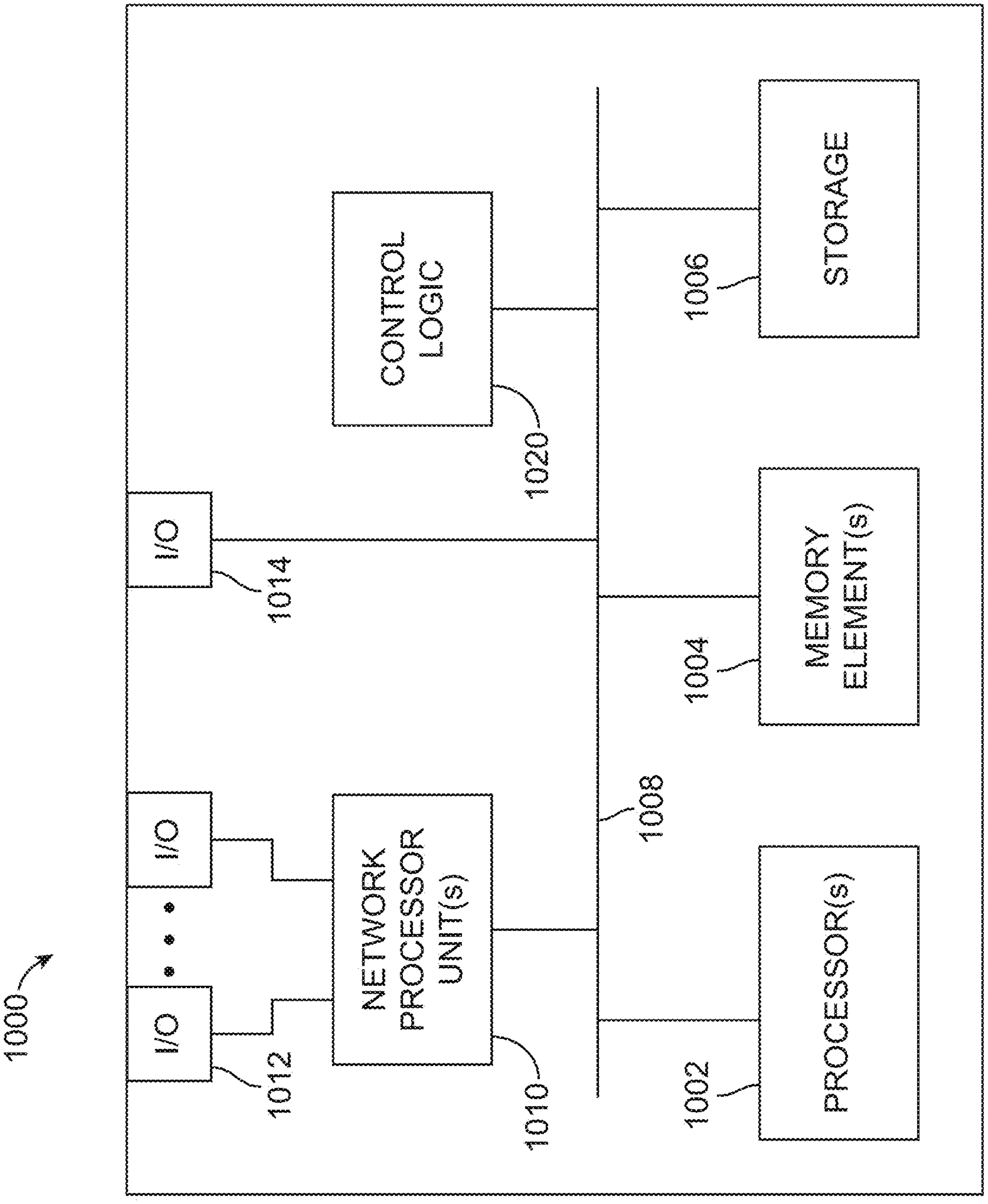
FIG. 10 is a block diagram of a device in which video encoding and decoding techniques presented herein may be employed or implemented, according to an example embodiment.

Referring to FIG. 10, FIG. 10 illustrates a hardware block diagram of a device 1000 that may perform functions associated with operations discussed herein in connection with the techniques depicted in FIGS. 1-9. The device 1000 may be a computer (laptop, desktop, etc.) or other device involved in video encoding/decoding operations, including video conference equipment, SmartPhones, tablets, streaming servers, etc.

In at least one embodiment, the device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for device 1000 can overlap in any manner and are not limited to the specific allocation of instructions and/or operations described herein.

In at least one embodiment, processor(s) 1002 is/are at least one hardware processor configured to execute various tasks, operations and/or functions for device 1000 as described herein according to software and/or instructions configured for device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processos, baseband signal processors, modems, PHYs, controllers, systems, managers, logic, and/or machines described herein can be construed as being encompassed within the broad term ‘processor’.

In at least one embodiment, memory element(s) 1004 and/or storage 1006 is/are configured to store data, information, software, and/or instructions associated with device 1000, and/or logic configured for memory element(s) 1004 and/or storage 1006. For example, any logic described herein (e.g., control logic 1020) can, in various embodiments, be stored for device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of device 1000 to communicate in order to exchange information and/or data. Bus 1008 can be implemented with any architecture designed for passing control, data and/or information between processors, memory elements/storage, peripheral devices, and/or any other hardware and/or software components that may be configured for device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment. The hardware-based packet classification solution may be integrated into one or more ASICs that form a part or an entirety of the network processor unit(s) 1010.

I/O interface(s) 1014 allow for input and output of data and/or information with other entities that may be connected to device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: obtaining pixel data for a plurality of regions that make up a video frame; identifying when pixels within a given region of the plurality of regions have the same color; assigning an identity flag to the given region to indicate that only a single color index to be used for all pixels of the given region is signaled; and arithmetic coding the identity flag such that a probability distribution of the arithmetic coding is dependent on a context that is based on previously signaled information.

In some aspects, the video frame is divided into blocks, and the plurality of regions are rows, columns or sub-blocks within a respective block.

In some aspects, the method further comprises including region type selection information that signals a region type to be represented by the identity flag to enable adaptively switching between types of regions for which the identity flag may be signaled.

In some aspects, the region type selection information that signals a region type to be represented by the identity flag is signaled at a block-level, frame-level, tile-level or sequence-level.

In some aspects, the context is based on identity flags previously signaled for one or more regions.

In some aspects, the context is based on an identity flag signaled for a previous region.

In some aspects, arithmetic coding includes arithmetic coding the single color index of the given region, and wherein the context is based on color indices signaled for previous regions and identity flags signaled for the given region and previous regions.

In some aspects, the techniques described herein relate to a method including: obtaining encoded video data; performing arithmetic decoding of an identity flag in the encoded video data using a context that is based on previously signaled information, the identity flag indicating that a given region of a plurality of regions that make up a video frame has only a single color index to be used for all pixels of the given region; and decoding the given region using the single color index.

In some aspects, the video frame is divided into blocks, and the plurality of regions are rows, columns or sub-blocks within a respective block.

In some aspects, the method includes: detecting in the encoded video data, region type selection information that indicates a region type represented by the identity flag; and adaptively switching between types of regions for which the identity flag is to be used based on the region type selection information.

In some aspects, the region type selection information that signals a region type to be represented by identity flags is signaled at a block-level, frame-level, tile-level or sequence-level.

In some aspects, the context is based on identity flags previously signaled for one or more regions.

In some aspects, the context is based on the identity flag signaled for a previous region.

In some aspects, the context is based on color indices signaled for previous regions and identity flags signaled for the given region and previous regions.

In some aspects, the techniques described herein relate to an apparatus including: a communication interface configured to enable network communications; a memory; and one or more processors coupled to the communication interface and the memory, wherein the one or more processors are configured to perform operations including: obtaining pixel data for a plurality of regions that make up a video frame; identifying when pixels within a given region of the plurality of regions have the same color; assigning an identity flag to the given region to indicate that only a single color index to be used for all pixels of the given region is signaled; and arithmetic coding the identity flag such that a probability distribution of the arithmetic coding is dependent on a context that is based on previously signaled information.

In some aspects, the video frame is divided into blocks, and the plurality of regions are rows, columns or sub-blocks within a respective block.

In some aspects, the one or more processors are configured to include region type selection information that signals a region type to be represented by the identity flag to enable adaptively switching between types of regions for which the identity flag may be signaled, wherein the region type selection information is signaled at a block-level, frame-level, tile-level or sequence-level.

In some aspects, the techniques described herein relate to an apparatus including: a communication interface configured to enable network communications; a memory; and one or more processors coupled to the communication interface and the memory, wherein the one or more processors are configured to perform operations including: obtaining encoded video data; performing arithmetic decoding of an identity flag in the encoded video data using a context that is based on previously signaled information, the identity flag indicating that a given region of a plurality of regions that make up a video frame has only a single color index to be used for all pixels of the given region; and decoding the given region using the single color index.

In some aspects, the video frame is divided into blocks, and the plurality of regions are rows, columns or sub-blocks within a respective block.

In some aspects, the one or more processors are configured to perform operations including: detecting in the encoded video data, region type selection information that indicates a region type represented by the identity flag; and adaptively switching between types of regions for which the identity flag is to be used based on the region type selection information.

In some aspects, the techniques described herein relate to one or more non-transitory computer readable storage media encoded with instructions that, when executed by one or more processors, cause the one or more processors to perform operations including: obtaining pixel data for a plurality of regions that make up a video frame; identifying when pixels within a given region of the plurality of regions have the same color; assigning an identity flag to the given region to indicate that only a single color index to be used for all pixels of the given region is signaled; and arithmetic coding the identity flag such that a probability distribution of the arithmetic coding is dependent on a context that is based on previously signaled information.

In some aspects, the techniques described herein relate to one or more non-transitory computer readable storage media encoded with instructions that, when executed by one or more processors, cause the one or more processors to perform operations including: obtaining encoded video data; performing arithmetic decoding of an identity flag in the encoded video data using a context that is based on previously signaled information, the identity flag indicating that a given region of a plurality of regions that make up a video frame has only a single color index to be used for all pixels of the given region; and decoding the given region using the single color index.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining pixel data for a plurality of regions that make up a video frame, wherein the video frame is divided into blocks and the plurality of regions are one of rows, columns or sub-blocks within a respective block;

providing region type selection information that signals a region type that is one of rows, columns or sub-blocks to enable adaptively switching between types of regions;

identifying when pixels within a given region of the plurality of regions have the same color, wherein the given region is a row or a column;

assigning an identity flag to the given region to indicate whether or not only a single color index is to be used for all pixels of the given region is signaled; and arithmetic coding of the identity flag such that a probability distribution of the arithmetic coding is dependent on a context that is based on previously signaled information.

2. The method of claim 1, wherein the region type selection information signals the region type to be represented by the identity flag to enable adaptively switching between types of regions for which the identity flag is signaled.

3. The method of claim 2, wherein the region type selection information that signals the region type to be represented by the identity flag is signaled at a block-level, frame-level, tile-level or sequence-level.

4. The method of claim 2, wherein the region type selection information that signals the region type to be represented by the identity flag is signaled at a block-level.

5. The method of claim 1, wherein the context is based on identity flags previously signaled for one or more regions.

6. The method of claim 5, wherein the context is based on the identity flag signaled for a previous region.

7. The method of claim 5, wherein arithmetic coding comprises arithmetic coding the single color index of the given region, and wherein the context is based on color indices signaled for previous regions and identity flags signaled for the given region and previous regions.

8. The method of claim 1, further comprising:

arithmetic coding the region type selection information such that a probability distribution of the arithmetic coding is dependent on a context that is based on previously signaled information.

9. A method comprising:

obtaining encoded video data representing an encoded video frame comprised of a plurality of regions, wherein the encoded video frame is divided into blocks and the plurality of regions are one of rows, columns or sub-blocks within a respective block;

detecting in the encoded video data, region type selection information that indicates a region type that is one of rows, columns or sub-blocks;

adaptively switching between types of regions based on the region type selection information;

performing arithmetic decoding of an identity flag in the encoded video data such that a probability distribution of the arithmetic decoding is dependent on a context that is based on previously signaled information, the identity flag indicating whether or not a given region that is, based on the region type selection information, either a row or a column that has only a single color index to be used for all pixels of the given region; and based on the identity flag, decoding the given region using the single color index.

10. The method of claim 9, wherein the context is based on identity flags previously signaled for one or more regions.

11. The method of claim 10, wherein the context is based on the identity flag signaled for a previous region.

12. The method of claim 11, wherein the context is based on color indices signaled for previous regions and identity flags signaled for the given region and previous regions.

13. The method of claim 9, wherein the region type selection information signals the region type to be represented by the identity flag to enable adaptively switching between types of regions for which the identity flag is signaled.

14. The method of claim 13, wherein the region type selection information that signals the region type to be represented by the identity flag is signaled at a block-level, frame-level, tile-level or sequence-level.

15. The method of claim 13, wherein the region type selection information that signals the region type to be represented by the identity flag is signaled at a block-level.

16. An apparatus comprising:

a communication interface configured to enable network communications;

a memory; and one or more processors coupled to the communication interface and the memory, wherein the one or more processors are configured to perform operations including:

obtaining pixel data for a plurality of regions that make up a video frame, wherein the video frame is divided into blocks and the plurality of regions are one of rows, columns or sub-blocks within a respective block;

providing region type selection information that signals a region type that is one of rows, columns or sub-blocks to enable adaptively switching between types of regions;

identifying when pixels within a given region of the plurality of regions have the same color, wherein the given region is a row or a column;

assigning an identity flag to the given region to indicate whether or not only a single color index is to be used for all pixels of the given region is signaled; and arithmetic coding of the identity flag such that a probability distribution of the arithmetic coding is dependent on a context that is based on previously signaled information.

17. The apparatus of claim 16, wherein the region type selection information signals the region type to be represented by the identity flag to enable adaptively switching between types of regions for which the identity flag is signaled.

18. The apparatus of claim 17, wherein the region type selection information that signals the region type to be represented by the identity flag is signaled at a block-level, frame-level, tile-level or sequence-level.

19. The apparatus of claim 16, wherein the region type selection information that signals the region type to be represented by the identity flag is signaled at a block-level.

20. The apparatus of claim 16, wherein the operations further include:

arithmetic coding the region type selection information such that a probability distribution of the arithmetic coding is dependent on a context that is based on previously signaled information.

21. An apparatus comprising:

a communication interface configured to enable network communications;

a memory; and one or more processors coupled to the communication interface and the memory, wherein the one or more processors are configured to perform operations including:

obtaining encoded video data representing an encoded video frame comprised of a plurality of regions, wherein the encoded video frame is divided into blocks and the plurality of regions are one of rows, columns or sub-blocks within a respective block;

detecting in the encoded video data, region type selection information that indicates a region type that is one of rows, columns or sub-blocks;

adaptively switching between types of regions based on the region type selection information;

performing arithmetic decoding of an identity flag in the encoded video data such that a probability distribution of the arithmetic decoding is dependent on a context that is based on previously signaled information, the identity flag indicating whether or not a given region that is, based on the region type selection information, either a row or a column that has only a single color index to be used for all pixels of the given region; and based on the identity flag, decoding the given region using the single color index.

22. The apparatus of claim 21, wherein the context is based on identity flags previously signaled for one or more regions.

23. The apparatus of claim 22, wherein the context is based on the identity flag signaled for a previous region.

24. The apparatus of claim 23, wherein the context is based on color indices signaled for previous regions and identity flags signaled for the given region and previous regions.

25. The apparatus of claim 21, wherein the region type selection information signals the region type to be represented by the identity flag to enable adaptively switching between types of regions for which the identity flag is signaled.

* * * * *